United States Patent [19]
Lee

[11] Patent Number: 5,234,083
[45] Date of Patent: Aug. 10, 1993

[54] MAGNETIC BRAKE

[76] Inventor: Ying-Che Lee, No. 231, Lung Shou St., Taoyuan City, Taiwan

[21] Appl. No.: 819,741

[22] Filed: Jan. 13, 1992

[51] Int. Cl.$^5$ .............................................. B60L 7/28
[52] U.S. Cl. ................................. 188/267; 188/159; 318/376
[58] Field of Search ..................... 188/267, 157, 159; 318/376

[56] References Cited

U.S. PATENT DOCUMENTS

| | | | |
|---|---|---|---|
| 2,066,131 | 12/1936 | White | 188/267 X |
| 2,412,228 | 12/1946 | Oetzel | 188/159 X |
| 4,084,810 | 4/1978 | Forsman | 188/151 X |
| 4,475,075 | 10/1984 | Munn | 188/159 X |

FOREIGN PATENT DOCUMENTS 2293100  6/1976  France ................................ 188/267

Primary Examiner—George E. A. Halvosa
Attorney, Agent, or Firm—Morton J. Rosenberg; David I. Klein

[57] ABSTRACT

A magnetic brake is provided having a combined collar and flywheel with a braking disc and a fan which are all rotatably mounted on a shaft fixed between a pair of frames. The magnetic brake further includes an electromagnetic coil wound on an electromagnetic ferrite core, a plurality of permanent magnets mounted on an inner surface of the collar, and a stator coil wound on a stator ferrite core disposed in a stator ferrite core seat. An electrical circuit is provided having a rectifying circuit coupled to a first voltage regulating circuit for powering the stator winding and the other circuitry. A digital-to-analog converter is included for converting an input digital control signal to an analog control signal. The output of the converter is coupled to a second voltage regulator, the output of which is coupled to a current regulating circuit for driving the stator winding. Thus, the magnetic brake does not require an external power source and utilizes digital signals to control the magnitude of the magnetic braking force.

4 Claims, 4 Drawing Sheets

MAGNETIC BRAKE

BACKGROUND OF THE INVENTION

The commonly used brakes found on exercising devices are of the frictional type, the hydraulic type, the air resistance type or the generator type. However, the frictional type is easily worn out and does not provide a smooth resistance force. As for the hydraulic type, there are the problems of oil leaking, noise and insufficient braking torque at high temperature. Regarding the air resistance type, they are too large in size and are difficult to adjust. The generator types are formed by a complicated structure and are very costly.

It is, therefore, an object of the present invention to provide a magnetic brake which may obviate and mitigate the above-mentioned drawbacks.

SUMMARY OF THE INVENTION

This invention relates to an improved magnetic brake.

It is the primary object of the present invention to provide a magnetic brake which does not require connection with an external power source.

It is another object of the present invention to provide a magnetic brake which may be connected with external digital signals, and utilize those signals to control the magnitude of the magnetic braking force.

It is still another object of the present invention to provide a magnetic brake which is simple in construction.

It is still another object of the present invention to provide a magnetic brake which is compact in size.

It is a further object of the present invention to provide a magnetic brake which is adjustable in braking force.

Other object and advantages, as well as a greater understanding of the present invention will be obtained by those having ordinary skill in the art, when the following detailed description is read in conjunction with the accompanying drawings.

DETAILED DESCRIPTION OF THE PREFERRED EMBODIMENT

Figure 1:
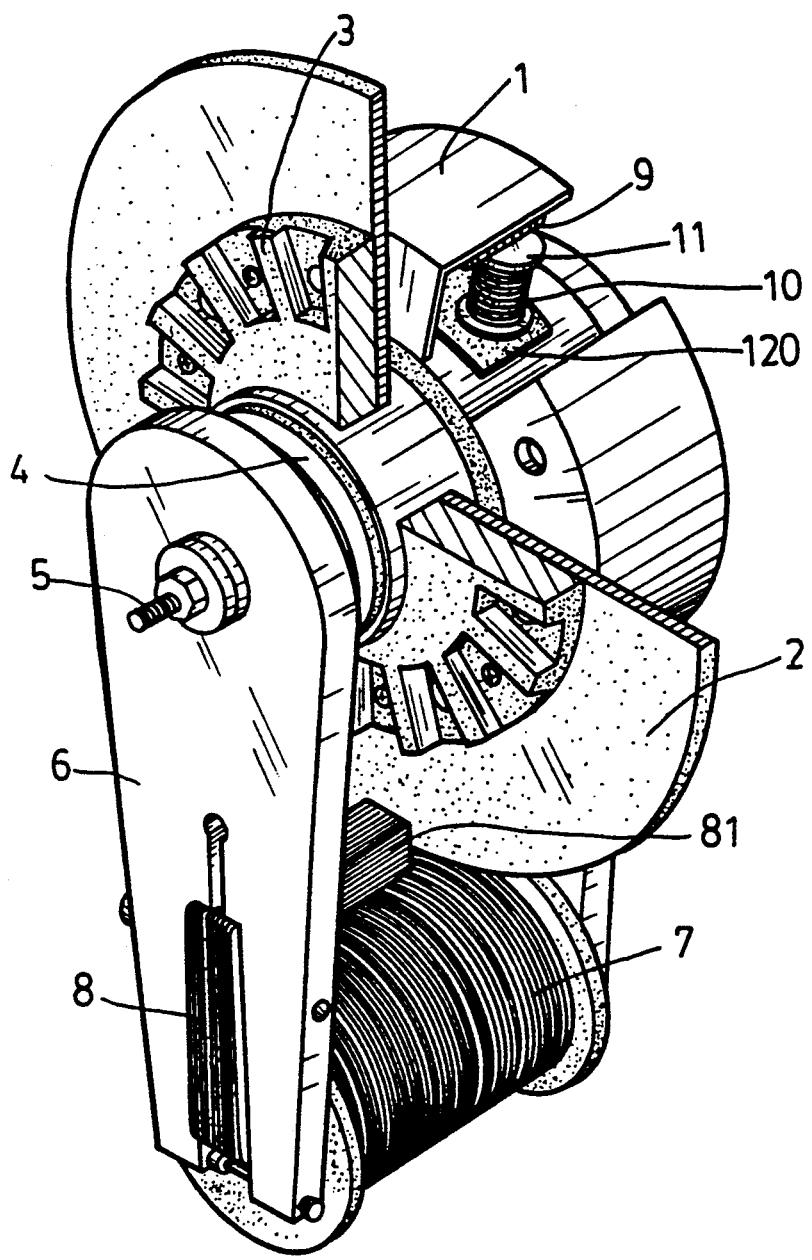
FIG. 1 is a perspective view of the present invention.

With reference to the drawings and in particular to FIG. 1 thereof, the magnetic brake according to the present invention comprises a combined collar and flywheel 1 to which is secured a braking disc 2, a fan 3, and a driving disc 4. That assembly is rotatably mounted on fixed shaft 5 coupled on opposing ends to a pair of frames 6. An electromagnetic coil 7 is mounted on an electromagnetic ferrite core 8, which is supported by the frames 6. A plurality of permanent magnets 9 are mounted on the collar 1 to face a stator coil 10, the stator coil 10 being mounted on a stator ferrite core 11 disposed within a stator ferrite core seat 120.

Figure 2:
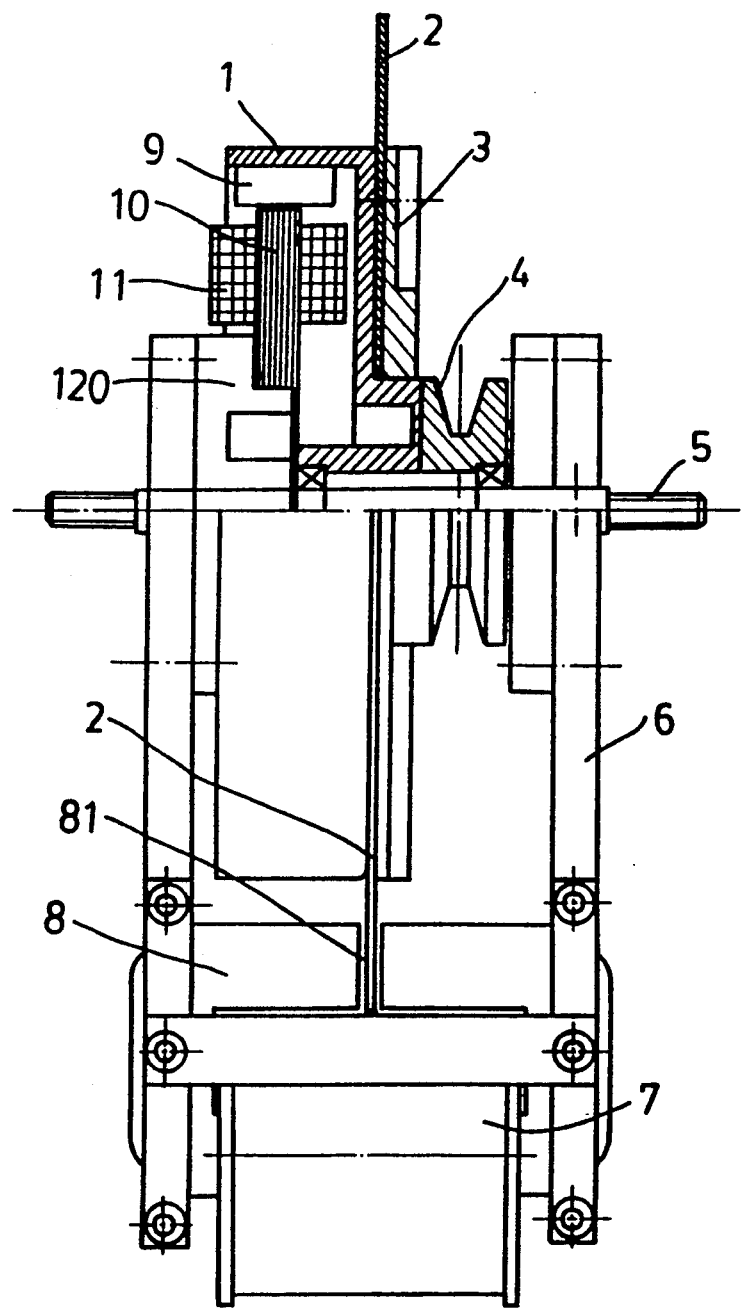
FIG. 2 is a partially sectioned view of the present invention.
Figure 3:
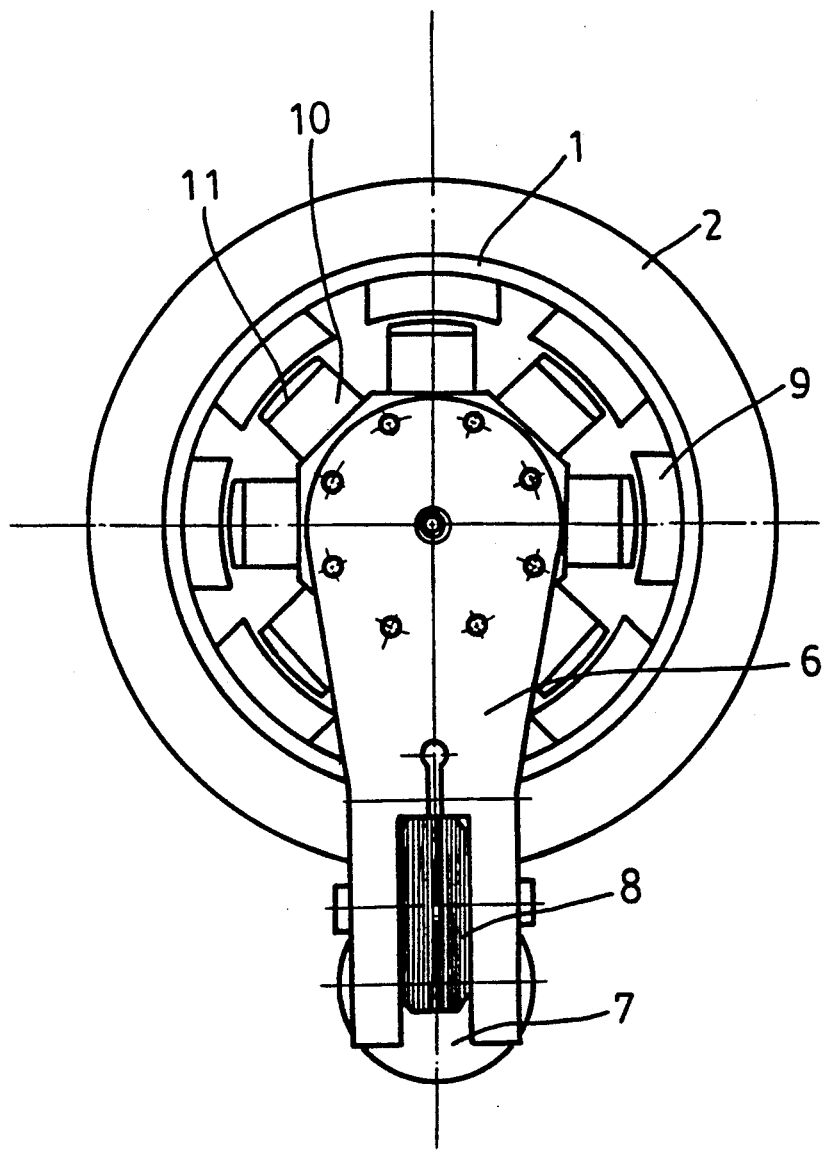
FIG. 3 is a side view of the present invention.

Referring now to FIGS. 2 and 3, the combined collar and the flywheel 1 is rotatably mounted on the fixed shaft 5 and is provided with a plurality of permanent magnets 9 mounted on an inner side thereof. The braking disc 2 is fixed on one side of the combined collar and flywheel 1 and made of copper sheets or the like. The fan 3 is secured to the outer side of the braking disc 2. The combined collar and flywheel 1, the braking disc 2 and the fan 3 are moved in unison with the driving disc 4 on the fixed shaft 5. The driving disc 4 may be a belt driving wheel (pulley) or a gear.

Figure 4:
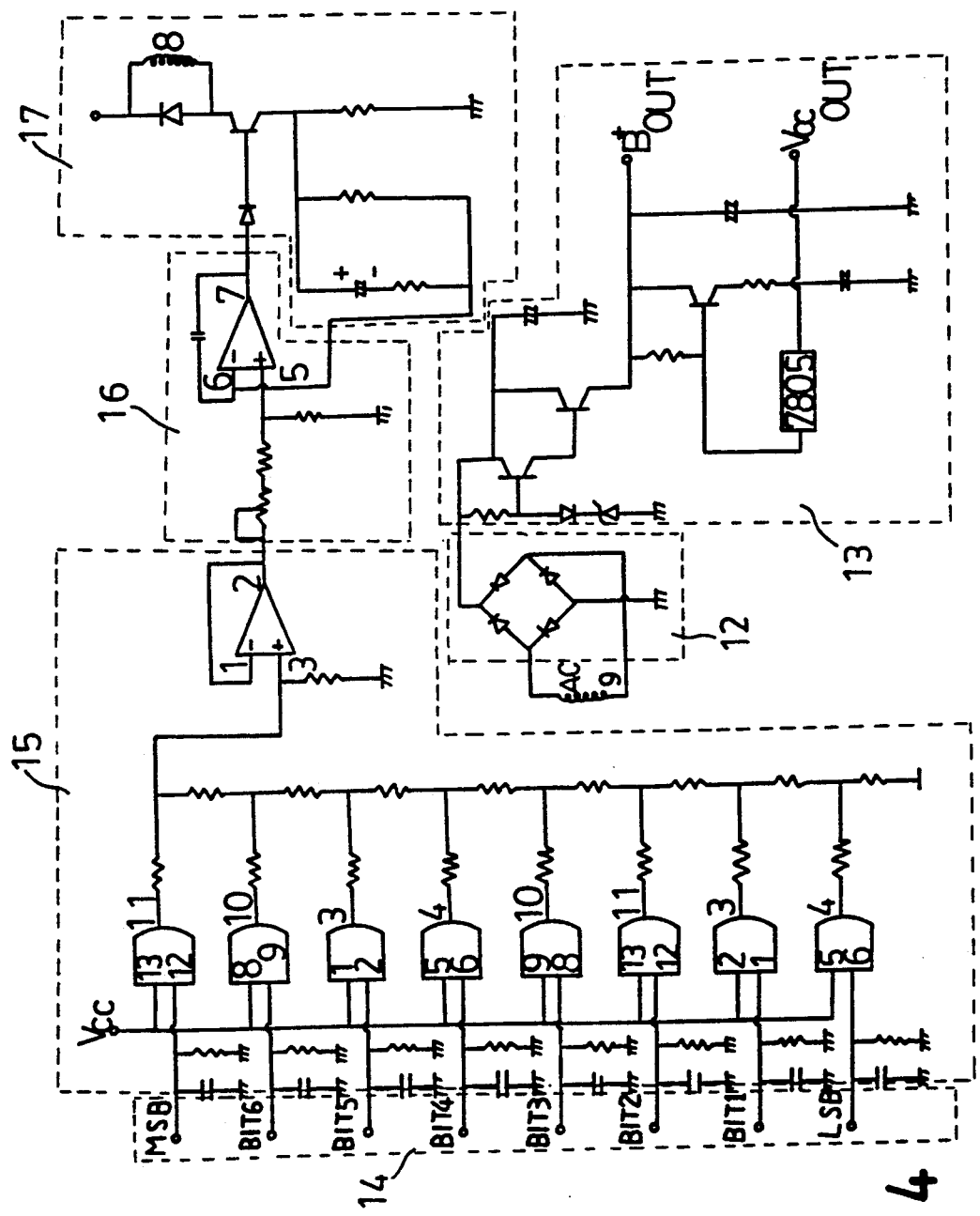
FIG. 4 shows an electrical circuit diagram of the present invention.

The electromagnetic coil 7 is fixedly mounted on the frames 6. The electromagnetic ferrite core 8 has a gap 81 through which the rim of the braking disc 2 rotatably passes. The magnetic circuit formed by the permanent magnets 9, the stator ferrite core 11 and the combined collar and flywheel 1, in combination with the stator coil 10 define a voltage generator. As the combined collar and flywheel 1 rotates, the stator coil 10 will generate a voltage which will then supply two substantially constant voltage levels from the B+ and Vcc output connections, by way of a rectifying circuit 12 and a first voltage regulating circuit 13, as shown in FIG. 4. The voltage form the B+ output terminal is supplied to one end of the electromagnetic coil 7, making it unnecessary to connect the electromagnetic coil 7 to an external power source.

The magnitude of the current flowing through the electromagnetic coil 7 is controlled by an externally applied digital signal coupled to the digital input 14 (see FIG. 4) which controls the current through the electromagnetic coil 7 by means of the digital-to-analog converter 15, a second voltage regulator circuit 16 and a current regulating circuit 17. Thus, the electromagnetic ferrite core 8 has a predetermined magnetic flux responsive to the current passing through coil 7, which in turn is determined by the digital input signal.

When the outer rim of the braking disc 2 passes through the gap 81 in the electromagnetic ferrite core 8, an eddy current is induced on the outer rim of the braking disc 2. The eddy current will produce a braking force, tending to make the braking disc 2 stop. Hence, such reverse torque can be used on an exercising device.

From the above description, it can be seen that the present invention utilizes digital signals to control the magnitude of the electric current passing through the electromagnetic coil 7, and thereby regulate the magnitude of the reverse torque. Further, the electric power for the electromagnetic coil 7 is supplied by an AC generator mounted on the same shaft as the braking disc 2, so that it is unnecessary to connect the electromagnetic coil 7 to an external power source and the magnetic braking force may be controlled by the input digital signal.

Although the present invention has been described with a certain degree of particularity, it is understood that the present disclosure is made by way of example only and that numerous changes in the detail of construction and the combination and arrangement of parts may be resorted to without departing from the spirit and scope of the invention as hereinafter claimed.

I claim:

1. A magnetic brake, comprising:
   a pair of frame members disposed in spaced parallel relation;
   a shaft member fixedly coupled to said pair of frame members on opposing ends thereof;
   a flywheel member rotatably mounted to said shaft member, said flywheel member having a cylindrically shaped wall extending axially from a first side thereof;

a plurality of permanent magnets disposed on an inner surface of said cylindrically shaped wall, each of said plurality of permanent magnets being circumferentially spaced one from another;

a stator support member coupled to one of said pair of frame members and extending into a cavity formed in said flywheel member, said cavity being defined by said cylindrically shaped wall;

ferrite stator core means coupled to said stator support member for providing a magnetic circuit path;

stator coil means mounted on said ferrite stator core means in spaced concentric alignment with said plurality of permanent magnets for generating an A.C. voltage responsive to displacement of said permanent magnets with respect thereto;

a braking disc coupled to said flywheel adjacent a second side thereof for rotation therewith;

a fan member coupled to said flywheel for rotation therewith, said fan member being disposed on said shaft member adjacent said braking disc;

a driving member coupled to said flywheel for rotatable displacement thereof responsive to rotational displacement of said driving member;

an electromagnetic ferrite core secured to said pair of frame members, said electromagnetic ferrite core having a gap formed therethrough, said gap being positionally located for passage of a perimeter portion of said braking disc therein;

an electromagnetic coil disposed on said electromagnetic ferrite core for inducing eddy currents in said braking disc responsive to a current flow in said electromagnetic coil to thereby generate a braking torque;

a rectifier circuit electrically coupled to said stator coil means for converting said A.C. voltage to a D.C. voltage;

a first voltage regulator circuit electrically coupled to said rectifier circuit for providing a substantially constant voltage signal on a first output thereof, said first output of said first voltage regulating circuit being electrically coupled to said electromagnetic coil for supplying said substantially constant voltage signal thereto;

a digital-to-analog converter circuit electrically coupled to a second output of said first voltage regulator circuit for supplying power thereto, said digital-to-analog converter circuit having a digital input for receiving an externally applied digital control signal and an output for providing an analog control signal representative of said digital control signal;

a second voltage regulator circuit electrically coupled to said digital-to-analog converter output for smoothing said analog control signal; and, a current regulating circuit electrically coupled to said electromagnetic coil and to an output of said second voltage regulator circuit for controlling a magnitude of said current flow through said electromagnetic coil responsive to said smoothed analog control signal, whereby said magnetic braking torque has a selected magnitude responsive to a predetermined value of said digital control signal input to said digital-to-analog converter.

2. The magnetic brake as recited in claim 1 where said braking disc is formed of copper sheets.

3. The magnetic brake as recited in claim 1 where said driving member is a pulley wheel.

4. The magnetic brake as recited in claim 1 where said driving member is a gear.

* * * * *